(12) United States Patent
Liu

(10) Patent No.: US 12,014,275 B2
(45) Date of Patent: Jun. 18, 2024

(54) METHOD FOR TEXT RECOGNITION, ELECTRONIC DEVICE AND STORAGE MEDIUM

(71) Applicant: BEIJING SENSETIME TECHNOLOGY DEVELOPMENT CO., LTD., Beijing (CN)

(72) Inventor: Xuebo Liu, Beijing (CN)

(73) Assignee: Beijing SenseTime Technology Development Co., Ltd., Beijing (CN)

(*) Notice: Subject to any disclaimer, the term of this patent is extended or adjusted under 35 U.S.C. 154(b) by 820 days.

(21) Appl. No.: 17/081,758

(22) Filed: Oct. 27, 2020

(65) Prior Publication Data

US 2021/0042474 A1 Feb. 11, 2021

Related U.S. Application Data

(63) Continuation of application No. PCT/CN2020/072804, filed on Jan. 17, 2020.

(30) Foreign Application Priority Data

Mar. 29, 2019 (CN) .......................... 201910251661.4

(51) Int. Cl.
*G06V 10/40* (2022.01)
*G06F 17/16* (2006.01)
(Continued)

(52) U.S. Cl.
CPC ............. *G06N 3/084* (2013.01); *G06F 17/16* (2013.01); *G06F 40/30* (2020.01); *G06N 3/04* (2013.01);
(Continued)

(58) Field of Classification Search
CPC ........ G06N 3/045; G06N 3/0464; G06N 3/08; G06N 3/084; G06N 3/04; G06V 30/10;
(Continued)

(56) References Cited

U.S. PATENT DOCUMENTS

2018/0204120 A1* 7/2018 Rei .......................... G06N 3/044
2018/0329886 A1* 11/2018 Li ........................... G06N 3/045
(Continued)

FOREIGN PATENT DOCUMENTS

CN  107590192 A     1/2018
CN  108228686 A  *  6/2018   ........... G06F 16/583
(Continued)

OTHER PUBLICATIONS

"Multi-contexts based Online Handwritten Chinese Text Recognition Methods and System Implementation", 2016, Qiu Liquan, A Dissertation Submitted for the Degree of Master, South China University of Technology, 84 pages.
(Continued)

*Primary Examiner* — Ian L Lemieux
*Assistant Examiner* — Woo C Rhim
(74) *Attorney, Agent, or Firm* — Cooper Legal Group, LLC

(57) ABSTRACT

A method for text recognition, an electronic device and a storage medium are provided. The method includes: performing feature extraction processing on an image to be detected to obtain a plurality of semantic vectors, each of the plurality of semantic vectors corresponds to one of a plurality of characters of a text sequence in the image to be detected; and sequentially performing recognition processing on the plurality of semantic vectors through a convolutional neutral network to obtain a recognition result of the text sequence.

9 Claims, 3 Drawing Sheets

(51) Int. Cl.
*G06F 40/30* (2020.01)
*G06N 3/04* (2023.01)
*G06N 3/084* (2023.01)
*G06V 10/24* (2022.01)
*G06V 10/82* (2022.01)

(52) U.S. Cl.
CPC .............. *G06V 10/24* (2022.01); *G06V 10/40* (2022.01); *G06V 10/82* (2022.01)

(58) Field of Classification Search
CPC ...... G06V 30/153; G06V 20/62; G06V 10/82; G06V 20/63; G06V 30/148; G06V 30/413; G06V 30/262; G06V 30/274; G06V 10/24; G06V 10/40; G06F 40/30; G06F 40/10; G06F 40/20; G06F 17/16
See application file for complete search history.

(56) References Cited

U.S. PATENT DOCUMENTS

| | | | |
|---|---|---|---|
| 2019/0050639 A1 | 2/2019 | Ast | |
| 2019/0087686 A1* | 3/2019 | Du | G06V 10/806 |
| 2019/0095429 A1 | 3/2019 | Fan et al. | |
| 2019/0096086 A1 | 3/2019 | Xu et al. | |
| 2019/0156156 A1* | 5/2019 | Tang | G06V 10/82 |
| 2019/0278846 A1* | 9/2019 | Xiang | G06F 16/00 |
| 2019/0377792 A1* | 12/2019 | Zhang | G06N 5/01 |
| 2019/0377797 A1 | 12/2019 | Liu et al. | |
| 2020/0026951 A1* | 1/2020 | Chowdhury | G06F 18/214 |
| 2020/0151250 A1* | 5/2020 | Xu | G06N 3/08 |

FOREIGN PATENT DOCUMENTS

| | | | | |
|---|---|---|---|---|
| CN | 108287585 A | | 7/2018 | |
| CN | 108288078 A | * | 7/2018 | ............. G06K 9/685 |
| CN | 108615036 A | * | 10/2018 | ........... G06K 9/3258 |
| CN | 108615036 A | | 10/2018 | |
| CN | 108874174 A | * | 11/2018 | ........... G06F 3/0233 |
| CN | 108874174 A | | 11/2018 | |
| CN | 108960330 A | | 12/2018 | |
| CN | 109389091 A | * | 2/2019 | ......... G06K 9/00442 |
| CN | 109446328 A | * | 3/2019 | |
| CN | 109471945 A | | 3/2019 | |
| JP | H954814 A | | 2/1997 | |
| JP | 6057112 B1 | | 1/2017 | |
| JP | 2017194806 A | | 10/2017 | |
| WO | 2018094294 A1 | | 5/2018 | |

OTHER PUBLICATIONS

"Deep Neural Network with Attention Model for Scene Text Recognition", 2017, Shuohao Li, Min Tang, Qiang Guo, Jun Lei and Jun Zhang, IET Computer Vision, vol. 11, Issue 7, 8 pages.

"Convolutional Sequence to Sequence Learning"; May 2017; Jonas Gehring, Michael Auli, David Grangier, Denis Yarats and Yann N. Dauphin; Computer Science, Computation and Language, 15 pgs.

"The Research and Implementation of Text Recognition System Based on Deep Learning"; Oct. 2018; Xiaowei Wu, Chinese Master's Theses Full-text Database, Information Science and Technology, No. 10, 77 pgs.

"Text Detection and Recognition in Image"; Apr. 2018; Bin Yag; Chinese Master's Theses Full-text Database, Information Science and Technology, No. 4, 82 pgs.

"Research of Chinese Named Entity Recognition Based on Deep Neural Network"; Feb. 2019; Sunyan Gu, Chinese Master's Theses Full-text Database, Information Science and Technology, No. 2, 68 pgs.

International Search Report in the international application No. PCT/CN2020/072804, dated Apr. 23, 2020, 3 pgs.

"FOTS: Fast Oriented Text Spotting with a Unified Network", Jan. 2018, Xuebo Liu, Ding Liang, Shi Yan, Dagui Chen, Yu Qiao and Junjie Yan, IEEE/CVF Conference on Computer Vision and Pattern Recognition, Reprinted from the Internet at: https://ieeexplore.ieee.org/document/8578693, pp. 5676-5685.

First Office Action of the Japanese application No. 2020-561646, dated Jan. 6, 2022, 21 pgs.

English translation of the Written Opinion of the International Search Authority in the international application No. PCT/CN2020/072804, dated Apr. 23, 2020, 4 pgs.

\* cited by examiner

METHOD FOR TEXT RECOGNITION, ELECTRONIC DEVICE AND STORAGE MEDIUM

CROSS-REFERENCE TO RELATED APPLICATION

This disclosure is a continuation application of International Application No. PCT/CN2020/072804, filed on Jan. 17, 2020, which claims priority to Chinese Patent Application No. 201910251661.4, filed on Mar. 29, 2019 and entitled "Method and Device for Text Recognition, Electronic Device and Storage Medium". The disclosures of International Application No. PCT/CN2020/072804 and Chinese Patent Application No. 201910251661.4 are hereby incorporated by reference in their entireties.

TECHNICAL FIELD

The disclosure relates to computer vision technologies, and particularly to a method and device for text recognition, an electronic device and a storage medium.

BACKGROUND

The text recognition in natural scenes is an important issue in the fields of image understanding and image restoration. The accurate text recognition can be used for, for example, picture understanding, automatic translation, blind guide, robot navigation and the like. At present, a text recognition system based on a codec framework typically uses a recurrent neural network as an encoder and a decoder.

SUMMARY

In a first aspect, a method for text recognition is provided. The method includes that: feature extraction processing is performed on an image to be detected to obtain multiple semantic vectors, here, each of the multiple semantic vectors corresponds to one of multiple characters of a text sequence in the image to be detected; and recognition processing is sequentially performed on the multiple semantic vectors through a convolutional neutral network to obtain a recognition result of the text sequence.

In a second aspect, a device for text recognition is provided. The device includes an extraction module and a recognition module. The extraction module is configured to perform feature extraction processing on an image to be detected to obtain multiple semantic vectors, here, each of the multiple semantic vectors corresponds to one of multiple characters of a text sequence in the image to be detected. The recognition module is configured to sequentially perform recognition processing on the multiple semantic vectors through a convolutional neutral network to obtain a recognition result of the text sequence.

In a third aspect, an electronic device is provided. The electronic device includes a processor and a memory configured to store instructions that, when executed by the processor, cause the processor to perform the following operations including: feature extraction processing is performed on an image to be detected to obtain multiple semantic vectors, here, each of the multiple semantic vectors corresponds to one of multiple characters of a text sequence in the image to be detected; and recognition processing is sequentially performed on the multiple semantic vectors through a convolutional neutral network to obtain a recognition result of the text sequence.

In a fourth aspect, a non-transitory computer-readable storage medium is provided. The computer-readable storage medium has stored thereon computer program instructions that, when executed by a processor, cause the processor to perform the following operation including: feature extraction processing is performed on an image to be detected to obtain multiple semantic vectors, here, each of the multiple semantic vectors corresponds to one of multiple characters of a text sequence in the image to be detected; and recognition processing is sequentially performed on the multiple semantic vectors through a convolutional neutral network to obtain a recognition result of the text sequence.

Further features and aspects of the disclosure will become apparent from the following detailed description of exemplary embodiments with reference to the accompanying drawings.

DETAILED DESCRIPTION

Various exemplary embodiments, features and aspects of the disclosure will be described below in detail with reference to the accompanying drawings. The same reference numbers in the accompanying drawings indicate the same or similar components.

Terms used in the disclosure are only adopted for the purpose of describing specific embodiments and not intended to limit the disclosure. In the disclosure, the terms in a singular form, such as "a/an", "said" and "the", are also intended to include a plural form concept, unless other meanings are clearly indicated from the context. "A and/or B" may indicate three cases: the A exists alone, both the A and the B coexist, and the B exists alone. "Including at least one of A, B or C" may include any one or more elements selected from a set composed of the A, the B and the C.

Although terms "first", "second", "third" and the like may be adopted to describe various pieces of information in the disclosure, the information should not be limited to these terms. These terms are only adopted to distinguish the information of the same type. For example, without departing from the scope of the disclosure, first information may also be called second information and, and similarly, second information may also be called first information. The term "if" used herein may be explained as "while" or "when" or "responsive to" which depends on the context.

In addition, for describing the disclosure better, many specific details are presented in the following specific implementation modes. It is understood by those skilled in the art that the disclosure may still be implemented even without some specific details. In some examples, methods, means, components and circuits known very well to those skilled in the art are not described in detail, to highlight the subject of the disclosure.

Figure 1:
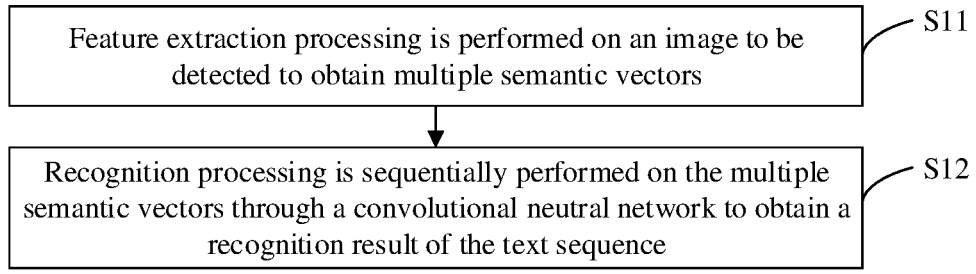
FIG. 1 illustrates a flowchart of a method for text recognition according to an embodiment of the disclosure.

FIG. 1 illustrates a flowchart of a method for text recognition according to an embodiment of the disclosure. As illustrated in FIG. 1, the method includes operations S11 and S12.

In S11, feature extraction processing is performed on an image to be detected to obtain multiple semantic vectors, here, each of the multiple semantic vectors corresponds to one of multiple characters of a text sequence in the image to be detected.

In S12, recognition processing is sequentially performed on the multiple semantic vectors through a convolutional neutral network to obtain a recognition result of the text sequence.

The method for text recognition provided by the embodiment of the disclosure can improve the accuracy of text recognition.

In some embodiments, the method for text recognition may be performed by a terminal device. The terminal device may be User Equipment (UE), a mobile device, a user terminal, a terminal, a cell phone, a cordless phone, a Personal Digital Assistant (PDA), a handheld device, a computing device, a vehicle-mounted device, a wearable device, etc. The method may be implemented by a processor of the terminal device through calling computer-readable instructions stored in a memory of the terminal device. Or, the terminal device may acquire the image to be detected, and send the image to be detected to a server, such that the server performs the method.

In some embodiments, the operation S11 may include that: feature extraction is performed on the image to be detected to obtain feature information; and down-sampling processing is performed on the feature information to obtain the multiple semantic vectors.

In some embodiments, the feature information may include, but not limited to, a feature map or a feature vector or the like.

In an example, the image to be detected may, for example, have a text sequence composed of multiple text characters. The various text characters of the text sequence may have a certain semantic connection relationship, i.e., the text sequence may have a semantic meaning.

In some embodiments, a feature extraction network may be used to extract the multiple semantic vectors of the image to be detected. The feature extraction network may be a neutral network such as a convolutional neural network. The operation that the feature extraction processing is performed on the image to be detected to obtain the multiple semantic vectors may include that: the image to be detected is input to the feature extraction network to obtain the multiple semantic vectors.

In an example, the feature extraction network may acquire, through encoding processing or the like, one or more feature matrices of the image to be detected. The feature matrixes each may have a dimension of M×P. For example, the P may be 32, and the ratio of the M to the P may correspond to a ratio of width to height (i.e., aspect ratio) of the image to be detected. For example, supposing that the image to be detected has a resolution ratio of 1024×768, one or more 43×32 feature maps may be obtained by the encoding processing.

In an example, the feature extraction network may perform down-sampling processing on the feature matrix to obtain one or more feature vectors to serve as the semantic vectors. For example, the down-sampling processing may be performed on the feature matrix having the dimension of M×P to obtain one or more feature vectors each having a dimension of M×1 to serve as one-dimensional semantic vectors. The 43×32 feature maps obtained by the encoding processing in the above example may be subjected to the down-sampling processing to obtain one or more 43×1 feature vectors.

By means of the above feature extraction processing, the complexity of the text recognition can be reduced, thereby improving the efficiency of the text recognition.

In some embodiments, before the feature extraction network is used to perform the feature extraction processing on the image to be detected, the feature extraction network is trained.

In some embodiments, multiple images with different backgrounds, different resolution ratios, different fonts, different illumination conditions, different sizes, different inclination directions and/or different fuzzy extents may be acquired to serve as first sample images to train the feature extraction network.

In some embodiments, the text in the first sample image may be labeled according to a probability dictionary to obtain a labeled semantic vector of the first sample image (the labeled semantic vector may be referred to as a ground-truth semantic vector of the first sample image hereinafter). The probability dictionary may include a probability distribution for the text defined by a user. For example, the vector including multiple elements may be used to indicate probability distribution information of each text in the probability dictionary. The text in the probability dictionary may be determined according to the probability distribution information of the text, or the probability distribution information of the text in the probability dictionary may be determined, thereby determining the semantic vector corresponding to the text. In an example, the probability distribution information, of the text in the first sample image, in the probability dictionary may be determined, and the semantic vector corresponding to the text in the first sample image is determined; and the first sample image is labeled according to the semantic vector to obtain labeled information. In this way, the labeled information may indicate the ground-truth semantic vector of the first sample image.

In some embodiments, the first sample image may be input to the feature extraction network for processing to obtain a sample semantic vector corresponding to the first sample image. The sample semantic vector is an output result of the feature extraction network for the first sample image, and the output result may have an error.

In some embodiments, a network loss of the feature extraction network may be determined according to the labeled information and the output result of the first sample image. In an example, the ground-truth semantic vector (i.e., the labeled information) of the first sample image is compared with the sample semantic vector (i.e., the output result) of the first sample image, and a difference between the ground-truth semantic vector and the sample semantic vector is determined as a loss function of the feature extraction network. For example, a cross-entropy loss function of the feature extraction network may be determined according to the labeled information and the output result. In an example, a regularized loss function may be taken as the network loss of the feature extraction network, thereby avoiding over-fitting of the network parameter of the feature extraction network during the iterative training.

In some embodiments, the network parameter of the feature extraction network may be adjusted according to the network loss. In an example, the network parameter may be adjusted to minimize the network loss, such that the adjusted feature extraction network has a relatively high goodness of fit and avoids the over-fitting. In an example, a gradient descent method may be used to perform back propagation of the network loss, so as to adjust the network parameter of the feature extraction network. For example, for the feature extraction network with tree connection between neurons, a stochastic gradient descent method and the like may be used to adjust the network parameter, so as to reduce the complexity of the process of adjusting the network parameter, improve the efficiency of adjusting the network parameter, and avoid the over-fitting of the adjusted network parameter.

In some embodiments, the iterative training may be performed on the feature extraction network, and the feature extraction network meeting a training termination condition is used to acquire the semantic vectors. The training termination condition may include the number of times of adjustments, the magnitude of network loss, the convergence of network loss, the divergence of network loss or the like. A predetermined number of first sample images may be input into the feature extraction network, i.e., the network parameter of the feature extraction network is adjusted for the predetermined number of times, and if the number of times of adjustments reaches to the predetermined number of times, the training termination condition is met. Or, the number of times of adjustments may not be limited, and if the network loss is reduced to a certain extent or converged to a certain threshold, the adjustment is stopped to obtain the adjusted feature extraction network, and the adjusted feature extraction network may be used to acquire the semantic vectors of the image to be detected. By training the feature extraction network with the difference between the labeled information and the output result, the complexity of the loss function is reduced, and the training speed is improved.

In some embodiments, in S12, a Graphics Processing Unit (GPU) may be used to accelerate the convolutional neutral network to improve the processing efficiency of the convolutional neutral network.

In some embodiments, in S12, priori information of a target semantic vector may be processed through the convolutional neutral network to obtain a weight parameter of the target semantic vector, here, the target semantic vector is one of the multiple semantic vectors; and a text recognition result corresponding to the target semantic vector may be determined according to the weight parameter and the target semantic vector.

By means of such a manner, the target semantic vector can be weighted by using the weight parameter obtained according to the priori information, and reference is made to the priori information during recognition of the target semantic vector, thereby improving the recognition accuracy of the target semantic vector.

In some embodiments, the priori information includes at least one of: a text recognition result corresponding to a previous semantic vector of the target semantic vector, or a start character. If the target semantic vector is the first one of the multiple semantic vectors, the priori information may be the start character. If the target semantic vector is not the first one of the multiple semantic vectors, the priori information may be the text recognition result corresponding to the previous semantic vector of the target semantic vector.

In some embodiments, encoding processing may be performed on the target semantic vector through at least one first convolutional layer of the convolutional neutral network to obtain a first vector of the target semantic vector. Encoding processing may be performed on the priori information of the target semantic vector through at least one second convolutional layer of the convolutional neutral network to obtain a second vector corresponding to the priori information. Then, the weight parameter of the target semantic vector may be determined based on the first vector and the second vector.

By means of such a manner, the weight parameter can include the priori information, thereby providing a basis for the recognition of the target semantic vector.

In some embodiments, the first vector may have semantic information of the target semantic vector, and the first vector may have a semantic connection relationship of a character corresponding to the target semantic vector.

In some embodiments, if the target semantic vector is the first one of the multiple semantic vectors, i.e., the target semantic vector is a semantic vector corresponding to the first character in the text sequence, an initial vector corresponding to the start character in the priori information of the target semantic vector may be encoded to obtain the second vector corresponding to the priori information. In an example, the initial vector corresponding to the start character may be a vector of which each element has a preset value (e.g., all the elements are 1). In an example, the characters in the text sequence are the characters A, B, C and D, the initial vector corresponding to the start character S may be encoded to obtain the second vector.

In some embodiments, if the target semantic vector is not the first one of the multiple semantic vectors, responsive to that the priori information includes the text recognition result corresponding to the previous semantic vector of the target semantic vector, word embedding processing may be performed on the text recognition result corresponding to the previous semantic vector to obtain a feature vector corresponding to the priori information; and the feature vector is encoded to obtain the second vector corresponding to the priori information. For example, if the characters in the text sequence are the characters A, B, C and D, and the target semantic vector is a semantic vector corresponding to the character B, C or D, the word embedding processing may be performed on the text recognition result corresponding to the previous semantic vector of the target semantic vector to obtain the feature vector corresponding to the priori information, and the feature vector is encoded to obtain the second vector corresponding to the priori information.

By means of such a manner, the convolutional neutral network can be used to recognize, according to a recognition result of a previous character, a character corresponding to a current target semantic vector, thereby avoiding the problem of uncontrollable long dependency, and improving the recognition accuracy.

In some embodiments, if the target semantic vector is not the first one of the multiple semantic vectors, the word embedding processing may be performed on the text recognition result corresponding to the previous semantic vector of the target semantic vector to determine the feature vector corresponding to the text recognition result. In an example, the word embedding processing may be performed on the text recognition result corresponding to the previous semantic vector by means of an algorithm such as Word2Vec or GloVe, to obtain the feature vector corresponding to the priori information.

In some embodiments, during the recognition of the text corresponding to the previous semantic vector of the target semantic vector, information (such as a background, a photographing angle, a size, an illumination condition, and/or a font) of the image to be detected may be recognized. That is, the text recognition result corresponding to the previous semantic vector is based on the information (such as the background, the photographing angle, the size, the illumination condition, and/or the font) of the image to be detected. Therefore, the feature vector that corresponds to the text recognition result corresponding to the previous semantic vector may serve as a basis for recognizing subsequent characters. Moreover, the feature vector that corresponds to the text recognition result corresponding to the previous semantic vector has semantic information of the text recognition result corresponding to the previous semantic vector, and has a semantic connection relationship of the text recognition result corresponding to the previous semantic vector.

In some embodiments, the weight parameter may be determined according to the first vector and the second vector. The weight parameter may be a weight matrix. For example, vector multiplication may be performed on the first vector and the second vector to obtain the weight matrix.

In some embodiments, an attention distribution vector corresponding to the target semantic vector may be obtained based on the weight parameter and the target semantic vector. The attention distribution vector may be decoded through at least one de-convolutional layer of the convolutional neutral network to determine the text recognition result corresponding to the target semantic vector.

In some embodiments, the weight parameter and the target semantic vector may be processed by a residual network to obtain the attention distribution vector, or, matrix multiplication (i.e., the weighted processing is performed on the target semantic vector) may be performed on the weight parameter (i.e., the weight matrix) and the target semantic vector to obtain the attention distribution vector. In this way, the attention distribution vector may have the information of the image to be detected (e.g., the background, photographing angle, size, illumination condition, and/or font) and the semantic information of the target semantic vector.

In some embodiments, the probability distribution information related to the probability dictionary may be determined according to the attention distribution vector. For example, the attention distribution vector may be decoded through the at least one de-convolutional layer of the convolutional neutral network to obtain the probability distribution information related to the probability dictionary. Then, the text in the probability dictionary may be determined according to the probability distribution information, i.e., the text recognition result corresponding to the target semantic vector is determined. The text recognition result may be used during the recognition of the next character, and so on, till all the characters in the text sequence are recognized. If all the characters in the text sequence have been recognized, an end vector may be input into the convolutional neutral network, and the elements in the end vector may be preset (for example, all the elements are 1). When the end vector is input, the recognition of the text sequence in the image to be detected is completed, and a recognition result of the text sequence is obtained.

In some embodiments, the semantic information of the text recognition result corresponding to the previous semantic vector may be included in the weight parameter (i.e., the weight matrix) of the feature vector that corresponds to the text recognition result corresponding to the previous semantic vector. The elements in the weight parameter may have the information of the image to be detected (e.g., the background, photographing angle, size, illumination condition and/or font), and may serve as a basis for recognition of the subsequent characters in the text sequence. The semantic information included in the weight parameter may also serve as the basis for recognition of the subsequent characters. For example, if the target semantic vector is the second one of the multiple semantic vectors, the previous semantic vector of the target semantic vector is the first semantic vector, and the character corresponding to the first semantic vector is the first character in the text sequence. The recognition result of the first character may serve as the basis for recognition of the character corresponding to the target semantic vector, and the recognition result of the target semantic vector may serve as the basis for recognition of the character corresponding to a third semantic vector (i.e., the next semantic vector of the target semantic vector).

In an example, when performing recognition of the first character in the text sequence, no recognized character exists in the image to be recognized, and thus the start character as the priori information is used to recognize the first character. For example, if the characters A, B, C and D exist in the text sequence, the start character S is used as the priori information, and the character A is recognized by using the initial vector corresponding to the start character S to obtain that the recognition result of the first character in the text sequence is A. Then, the character B is recognized by using the recognized character A to obtain the recognition result B of the second character. By the same reasoning, all the characters A, B, C and D are recognized to obtain the recognition result of the text sequence.

By means of such a manner, the convolutional neutral network may be used to recognize, according to a recognition result of a previous character, a character corresponding to a current target semantic vector, thereby avoiding the problem of uncontrollable long dependency, and improving the recognition accuracy.

In some embodiments, before the text recognition result is determined by using the convolutional neutral network, the convolutional neutral network is trained.

In some embodiments, multiple images with different backgrounds, different resolution ratios, different fonts, different illumination conditions, different sizes, different inclination directions and/or different fuzzy extents may be acquired to serve as second sample images, and the convolutional neutral network is trained by using the multiple second sample images.

In some embodiments, probability distribution information of characters in each second sample image may be obtained according to the probability dictionary, and the second sample image is labeled according to the probability distribution information to obtain labeled information of each character in the second sample image, i.e., the labeled information is ground-truth probability distribution information of the corresponding character in the second sample image.

In some embodiments, the feature extraction processing may be performed on any second sample image to obtain multiple semantic vectors each corresponding to one of the multiple characters in the second sample image. The first semantic vector may be input into the first convolutional layer of the convolutional neutral network and the start character may be input into the second convolutional layer of the convolutional neutral network, to obtain a weight parameter of the first semantic vector. Further, the weight parameter (i.e., the weight matrix) may be used to weight (i.e., the matrix multiplication is performed) the first semantic vector to obtain a sample attention distribution vector corresponding to the first semantic vector.

In some embodiments, the sample attention distribution vector may be decoded through the de-convolutional layer of the convolutional neutral network to obtain the probability distribution information output by the convolutional neutral network, i.e., an output result of the convolutional neutral network. Further, the network loss of the convolutional neutral network may be determined according to the labeled information (the ground-truth probability distribution information) and the output result (the probability distribution information output by the convolutional neutral network). In an example, the labeled information of the character in the second sample image is compared with the output result of the convolutional neutral network, and a difference between the labeled information and the output result may be determined as a loss function of the convolutional neutral network. For example, a cross-entropy loss function of the convolutional neutral network may be determined according to the labeled information and the output result. In an example, a regularized loss function may be taken as the network loss of the convolutional neutral network, thereby avoiding over-fitting of the network parameter of the convolutional neutral network during the iterative training.

In some embodiments, the network parameter of the convolutional neutral network may be adjusted according to the network loss. In an example, the network parameter may be adjusted to minimize the network loss, such that the adjusted convolutional neutral network has a relatively high goodness of fit and avoids the over-fitting. In an example, a gradient descent method may be used to perform back propagation of the network loss, so as to adjust the network parameter of the convolutional neutral network. For example, the convolutional neutral network with tree connection between neurons may use a stochastic gradient descent method and the like to adjust the network parameter, so as to reduce the complexity of the process of adjusting the network parameter, improve the efficiency of adjustment of the network parameter, and avoid the over-fitting case of the adjusted network parameter.

In some embodiments, the character recognized by the convolutional neutral network may be determined according to the probability distribution information output by the convolutional neutral network and the probability dictionary, and word embedding processing is performed on the character to obtain a feature vector corresponding to the character. Further, the feature vector may be input into the second convolutional layer of the convolutional neutral network and the second semantic vector in the second sample image is input into the first convolutional layer of the convolutional neutral network, to obtain a weight parameter of the second semantic vector. The weight parameter may be used to weight the second semantic vector to obtain a sample attention distribution vector corresponding to the second semantic vector. Then, the sample attention distribution vector may be decoded through the de-convolutional layer of the convolutional neutral network to obtain the probability distribution information. The network loss may be determined according to the probability distribution information and the labeled information of the second character, and the network parameter of the convolutional neutral network is adjusted again by using the network loss. In an example, iterative adjustment may be performed in such a manner. For example, a weight parameter of a third semantic vector may be obtained according to the feature vector corresponding to the second character recognized by the convolutional neutral network and the third semantic vector, thereby obtaining a sample attention distribution vector corresponding to the third semantic vector; and a network loss may be determined by decoding the sample attention distribution vector, and the convolutional neutral network is adjusted again according to the network loss. By the same reasoning, the convolutional neutral network may further be adjusted according to the third character and the fourth semantic vector, the convolutional neutral network is adjusted according the fourth character and the fifth semantic vector . . . till all the characters in the second sample image are recognized. In this way, the network parameter of the convolutional neutral network is adjusted for multiple times.

In some embodiments, if the convolutional neutral network meets a training termination condition, the convolutional neutral network may be used to recognize the text sequence in the image to be detected. The training termination condition may include the number of times of adjustments, the magnitude of network loss, the convergence of network loss, the divergence of network loss, etc. The network parameter of the convolutional neutral network may be adjusted for the predetermined number of times, and if the number of times of adjustments reaches to the predetermined number of times, the training termination condition is met. Or, the number of times of adjustments may not be limited, and if the network loss is reduced to a certain extent or converged to a certain threshold, the adjustment is stopped to obtain the adjusted convolutional neutral network.

The method for text recognition provided by the embodiment of the disclosure may extract the semantic vectors from the image to be detected, thereby reducing the complexity of text recognition and improving the efficiency of text recognition. The convolutional neutral network may be used to recognize, according to a recognition result of a previous character, a character corresponding to a current target semantic vector, thereby avoiding the problem of uncontrollable long dependency, and improving the recognition accuracy. A GPU may be used to accelerate the convolutional neutral network to improve the processing efficiency of the convolutional neutral network.

Figure 2:
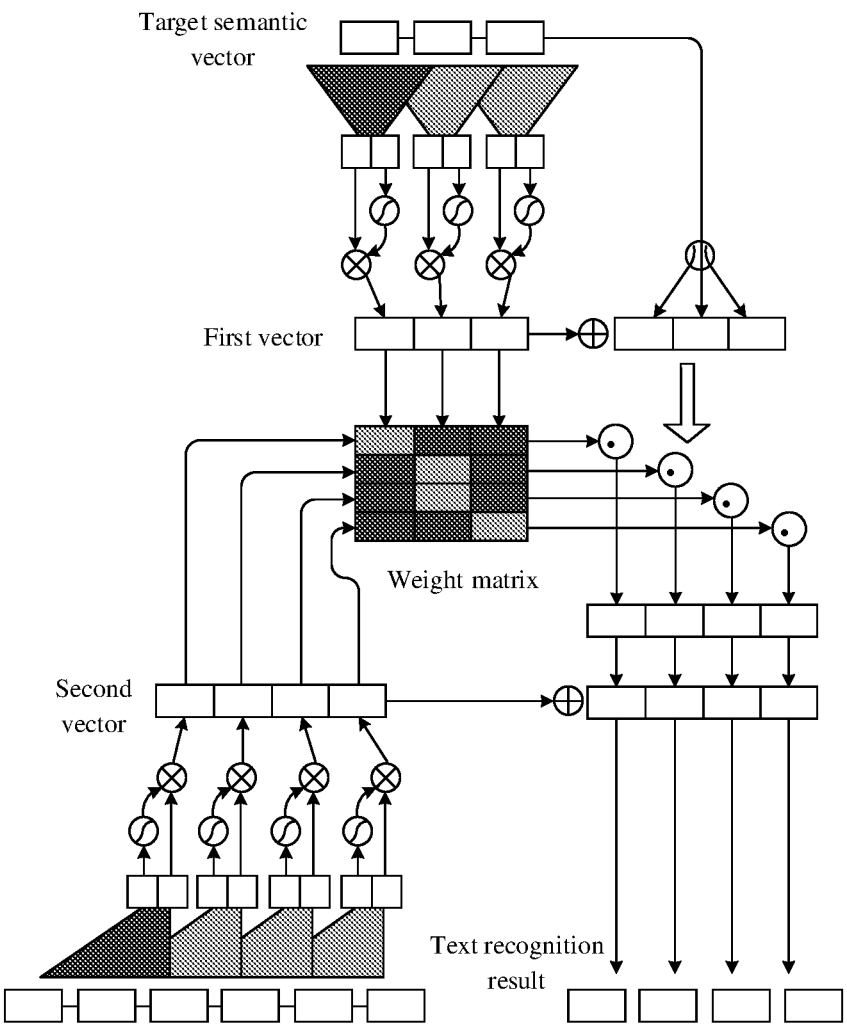
FIG. 2 illustrates a diagram of a convolutional neutral network-based codec framework for text recognition according to an embodiment of the disclosure.

FIG. 2 illustrates a convolutional neutral network-based codec framework for text recognition according to an embodiment of the disclosure.

In some embodiments, feature extraction processing may be performed on the image to be detected to obtain multiple semantic vectors. Priori information of a target semantic vector may be processed through the convolutional neutral network to obtain a weight parameter of the target semantic vector, and a text recognition result corresponding to the target semantic vector may be determined according to the weight parameter and the target semantic vector. The target semantic vector is any one of the multiple semantic vectors.

In some embodiments, the multiple semantic vectors may correspond to multiple characters of the text sequence, for example, each of the multiple characters of the text sequence corresponds to one of the multiple semantic vectors, which is not limited by the embodiment of the disclosure. If the target semantic vector is the first one of the multiple semantic vectors (i.e., the semantic vector corresponding to the first character of the text sequence in the image to be detected), the target semantic vector is input into the first convolutional layer of the convolutional neutral network for encoding processing to obtain a first vector; and the initial vector corresponding to the start character is input into the second convolutional layer of the convolutional neutral network for the encoding processing to obtain a second vector. Further, vector multiplication may be performed on the first vector and the second vector to obtain the weight parameter (i.e., the weight matrix) of the first semantic vector.

In some embodiments, the first semantic vector may be weighted by using the weight matrix to obtain an attention distribution vector corresponding to the first semantic vector, and the attention distribution vector may be decoded through the at least one de-convolutional layer of the convolutional neutral network to obtain the probability distribution information related to the probability dictionary. Further, the text in the probability dictionary may be determined according to the probability distribution information, i.e., the text recognition result corresponding to the first semantic vector is determined, thereby obtaining the recognition result of the first character.

In some embodiments, the word embedding processing may be performed on the recognition result of the first character to obtain a feature vector corresponding to the first character. The feature vector corresponding to the first character may be input into the second convolutional layer of the convolutional neutral network for encoding processing to obtain a second vector corresponding to the first character. The second semantic vector (i.e., a semantic vector corresponding to the second character of the character sequence in the image to be detected) may be input into the first convolutional layer of the convolutional neutral network to obtain the first vector of the second semantic vector. Further, vector multiplication may be performed on the first vector of the second semantic vector and the second vector corresponding to the first character to obtain the weight matrix of the second semantic vector. The weight matrix may be used to perform weighted processing (i.e., the matrix multiplication) on the second semantic vector, and the weighted second semantic vector is input into a fully-connected layer of the convolutional neutral network to obtain the attention distribution vector corresponding to the second semantic vector. The attention distribution vector corresponding to the second semantic vector may be decoded through the at least one de-convolutional layer of the convolutional neutral network to obtain the probability distribution information related to the probability dictionary (i.e., the probability distribution of the recognition result of the second character). The text in the probability dictionary may be determined according to the probability distribution information, i.e., the recognition result of the second character may be obtained. Further, the recognition result of the second character may further be used to determine the recognition result of the third character, and the recognition result of the third character is used to determine the recognition result of the fourth character, and so on.

In an example, when performing recognition of the first character in the text sequence, no recognized character exists in the image to be detected, and thus the start character as the priori information is used to recognize the first character. For example, if the characters A, B, C and D exist in the text sequence, the start character S is used as the priori information, and the character A is recognized by using the initial vector corresponding to the start character S to obtain that the recognition result of the first character in the text sequence is A. Then, the character B is recognized by using the recognized character A to obtain the recognition result B of the second character. By the same reasoning, all the characters A, B, C and D are recognized to obtain the recognition result of the text sequence.

In some embodiments, iterative processing may be performed on each semantic vector in the image to be detected in the above manner, such that the recognition result of each character in the image to be detected may be obtained, till all the characters in the text sequence are recognized. When all the characters in the text sequence are recognized, the end vector may be input into the convolutional neutral network to complete the recognition of the text sequence in the image to be detected, so as to obtain the recognition result of the text sequence.

Figure 3:
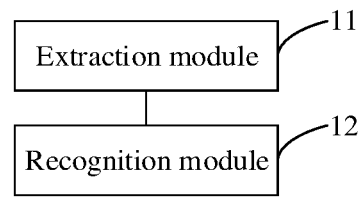
FIG. 3 illustrates a block diagram of a device for text recognition according to an embodiment of the disclosure.

FIG. 3 illustrates a block diagram of a device for text recognition that may implement the method for text recognition according to the above any embodiment. As illustrated in FIG. 3, the device may include an extraction module 11 and a recognition module 12.

The extraction module 11 may be configured to perform feature extraction processing on an image to be detected to obtain multiple semantic vectors, here, each of the multiple semantic vectors corresponds to one of multiple characters of a text sequence in the image to be detected. The recognition module 12 may be configured to sequentially perform recognition processing on the multiple semantic vectors through a convolutional neutral network to obtain a recognition result of the text sequence.

In some embodiments, the recognition module may be configured to: process priori information of a target semantic vector through the convolutional neutral network to obtain a weight parameter of the target semantic vector, here, the target semantic vector is one of the multiple semantic vectors; and determine a text recognition result corresponding to the target semantic vector according to the weight parameter and the target semantic vector.

In some embodiments, the priori information includes at least one of: a text recognition result corresponding to a previous semantic vector of the target semantic vector, or a start character.

In some embodiments, the recognition module may be configured to: perform encoding processing on the target semantic vector through at least one first convolutional layer of the convolutional neutral network to obtain a first vector of the target semantic vector; performing encoding processing on the priori information of the target semantic vector through at least one second convolutional layer of the convolutional neutral network to obtain a second vector corresponding to the priori information; and determine the weight parameter based on the first vector and the second vector.

In some embodiments, the recognition module may be configured to: perform, responsive to that the priori information includes the text recognition result corresponding to the previous semantic vector of the target semantic vector, word embedding processing on the text recognition result corresponding to the previous semantic vector to obtain a feature vector corresponding to the priori information; and encode the feature vector to obtain the second vector.

In some embodiments, the recognition module may be configured to: encode an initial vector corresponding to the start character in the priori information to obtain the second vector.

In some embodiments, the recognition module may be configured to: obtain an attention distribution vector corresponding to the target semantic vector based on the weight parameter and the target semantic vector; and decode the attention distribution vector through at least one de-convolutional layer of the convolutional neutral network to determine the text recognition result corresponding to the target semantic vector.

In some embodiments, the extraction module may be configured to: perform feature extraction on the image to be detected to obtain feature information; and perform down-sampling processing on the feature information to obtain the multiple semantic vectors.

Figure 4:
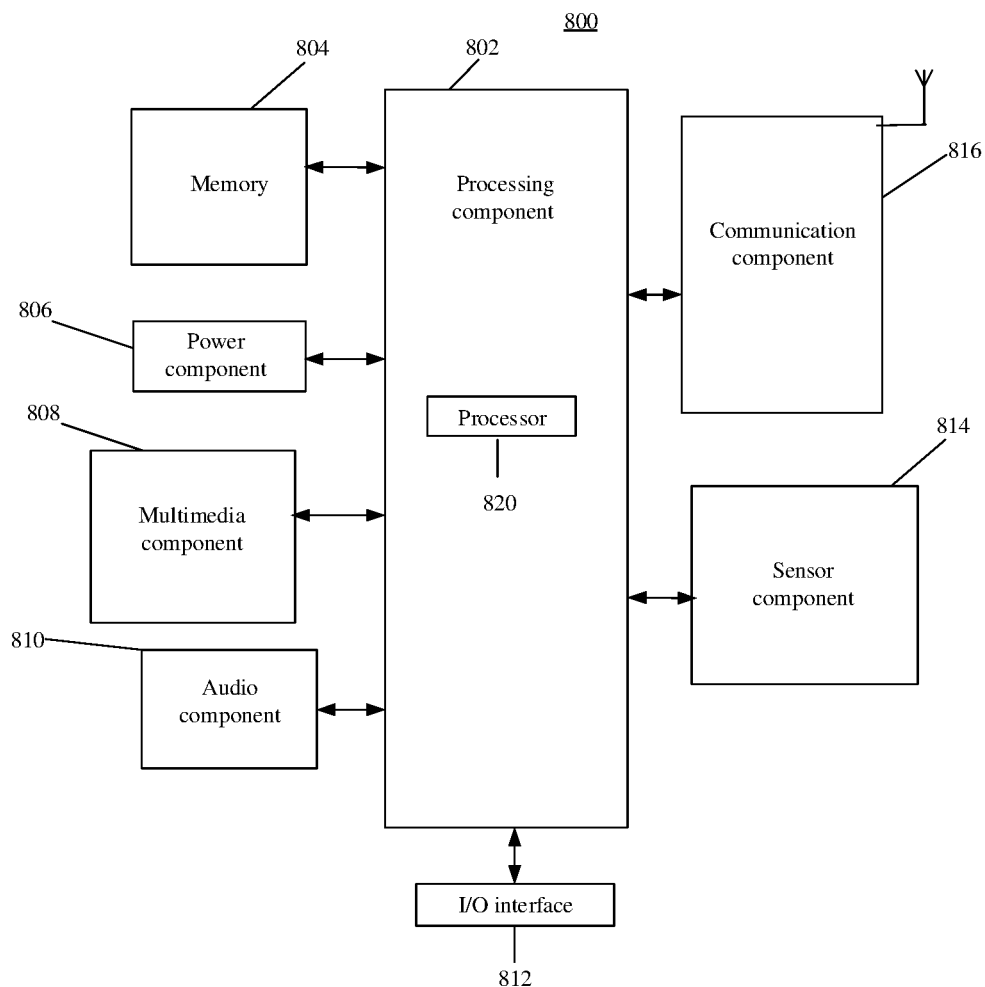
FIG. 4 illustrates a block diagram of an electronic device according to an embodiment of the disclosure.

FIG. 4 illustrates a block diagram of an electronic device 800 according to an exemplary embodiment. For example, the electronic device 800 may be a terminal such as a mobile phone, a computer, a digital broadcast terminal, a messaging device, a gaming console, a tablet, a medical device, exercise equipment and a PDA.

Referring to FIG. 4, the electronic device 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the electronic device 800, such as the operations associated with display, telephone calls, data communications, camera operations, and recording operations. The processing component 802 may include one or more processors 820 to execute instructions to perform all or part of the operations in the above method for text recognition. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 may store various types of data to support the operation on the electronic device 800. Examples of such data include instructions for any application or method operated on the electronic device 800, contact data, phonebook data, messages, pictures, videos, etc. The memory 804 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk etc.

The power component 806 may provide power to various components of the electronic device 800. The power component 806 may include a power management system, one or more power sources, and any other components associated with the generation, management, and distribution of power in the electronic device 800.

The multimedia component 808 may include a screen providing an interface (such as the GUI) between the electronic device 800 and the user. In some embodiments, the screen may include a liquid crystal display (LCD) and a touch panel (TP). If the screen includes the touch panel, the screen may be implemented as a touch screen to receive input signals from the user. The touch panel may include one or more sensors to sense touches, swipes, and/or other gestures on the touch panel. The sensors may not only sense a boundary of a touch or swipe action, but also sense a period of time and a pressure associated with the touch or swipe action. In some embodiments, the multimedia component 808 includes a front camera and/or a rear camera. The front camera and/or the rear camera may collect external multimedia data when the electronic device 800 is in an operation mode such as a photographing mode or a video mode. Each of the front camera and the rear camera may be a fixed optical lens system or have focus and optical zoom capability.

The audio component 810 may output and/or input audio signals. For example, the audio component 810 may include a microphone. The microphone may collect an external audio signal when the electronic device 800 is in an operation mode, such as a call mode, a recording mode, and a voice recognition mode. The collected audio signal may be stored in the memory 804 or transmitted via the communication component 816. In some embodiments, the audio component 810 further includes a speaker configured to output audio signals.

The I/O interface 812 may provide an interface between the processing component 802 and peripheral devices. The peripheral device may be a keyboard, a click wheel, buttons, and the like. The buttons may include, but are not limited to, a home button, a volume button, a starting button, and a locking button.

The sensor component 814 may include one or more sensors to provide status information of various aspects of the electronic device 800. For example, the sensor component 814 may include a proximity sensor, configured to detect the presence of nearby objects without any physical contact. The sensor component 814 may also include a light sensor, such as a Complementary Metal Oxide Semiconductor (CMOS) or Charge Coupled Device (CCD) image sensor, configured for use in an imaging application. In some embodiments, the sensor component 814 may also include an accelerometer sensor, a gyroscope sensor, a magnetic sensor, a pressure sensor, or a temperature sensor.

The communication component 816 may be configured to facilitate wired or wireless communication between the electronic device 800 and another device. The electronic device 800 may access a communication-standard-based wireless network, such as a Wireless Fidelity (WiFi) network, a 2nd-Generation (2G) or 3rd-Generation (3G) network or a combination thereof. In an exemplary embodiment, the communication component 816 may receive a broadcast signal or broadcast associated information from an external broadcast management system via a broadcast channel In an exemplary embodiment, the communication component 816 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In an exemplary embodiment, the electronic device 800 may be implemented as one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, to implement the above any method for text recognition.

In an exemplary embodiment, a non-temporary computer-readable storage medium (such as the memory 804) may further be provided, which stores a computer program instruction thereon. The computer program instruction is executed by a processor (such as the processor 820) to cause the processor to implement the above any method for text recognition.

Figure 5:
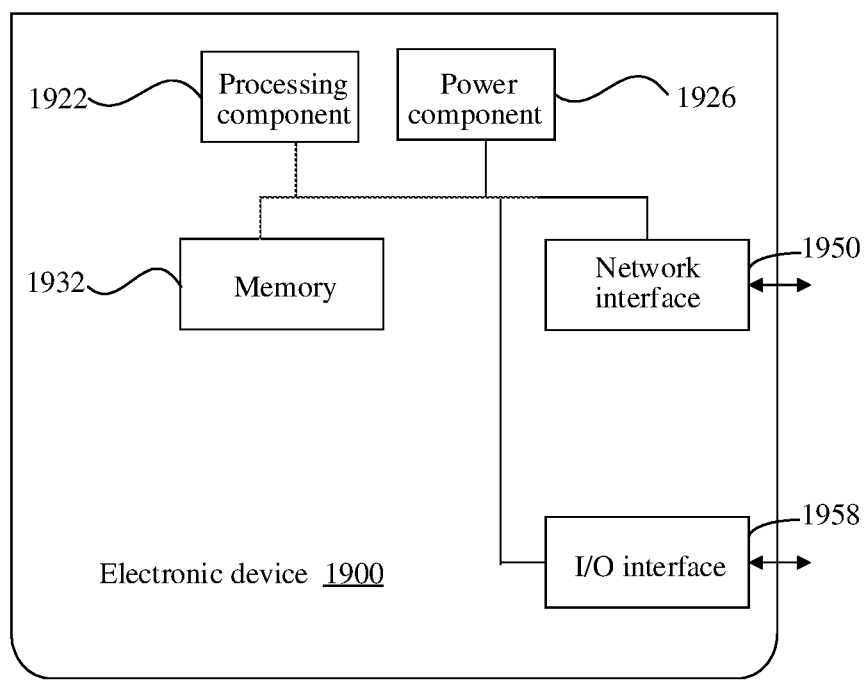
FIG. 5 illustrates a block diagram of an electronic device according to an embodiment of the disclosure.

FIG. 5 illustrates a block diagram of an electronic device 1900 according to an exemplary embodiment. For example, the electronic device 1900 may be a server.

Referring to FIG. 5, the electronic device 1900 may include: a processing component 1922, including one or more processors; and a memory resource represented by a memory 1932, configured to store instructions (for example, application programs) executable by the processing component 1922. The processing component 1922 may execute the instructions to implement the above any method for text recognition.

The electronic device 1900 may further include: a power component 1926 configured to execute power management of the electronic device 1900; a wired or wireless network interface 1950 configured to connect the electronic device 1900 to a network; and an I/O interface 1958.

The electronic device 1900 may be operated based on an operating system stored in the memory 1932, for example, Windows Server™, Mac OS X™, Unix™, Linux™ FreeBSD™ or the like.

In an exemplary embodiment, a non-temporary computer-readable storage medium (such as the memory 1932) may further be provided, which stores computer program instructions thereon. The computer program instructions are executed by a processor (such as the processor 1922) to cause the processor to implement the above any method for text recognition.

The disclosure may be implemented as a device (a system), a method and/or a computer program product. The computer program product may include a computer-readable storage medium having stored thereon computer-readable program instructions configured to enable a processor to implement the method for text recognition of the disclosure.

The flowcharts and block diagrams in the drawings illustrate probably implemented system architectures, functions and operations of the device (system), method and computer program product according to various embodiments of the disclosure. On this aspect, each block in the flowcharts or the block diagrams may represent part of a module, a program segment or an instruction, and the part of the module, the program segment or the instruction includes one or more executable instructions configured to realize a specified logical function. In some alternative implementations, the functions marked in the blocks may also be realized in a sequence different from those marked in the drawings. For example, two continuous blocks may actually be executed substantially concurrently or may be executed in a reverse sequence sometimes, which is determined by the involved functions. It is further to be noted that each block in the block diagrams and/or the flowcharts and a combination of the blocks in the block diagrams and/or the flowcharts may be implemented by a dedicated hardware-based system configured to execute a specified function or operation, or may be implemented by a combination of a special hardware and computer instructions.

The embodiments of the disclosure are described above. The above description is exemplary and is not intended to limit the disclosure. Many modifications and changes are apparent to those of ordinary skill in the art without departing from the scope and spirit of the disclosure. Any modifications, equivalent replacements, improvements and the like made within the spirit and principle of the disclosure shall fall within the scope of protection of the disclosure.

The invention claimed is:

1. A method for text recognition, comprising:
performing feature extraction processing on an image to be detected to obtain a plurality of semantic vectors, wherein each of the plurality of semantic vectors corresponds to a respective one of multiple characters of a text sequence in the image to be detected; and
sequentially performing recognition processing on the plurality of semantic vectors through a convolutional neutral network to obtain a recognition result of the text sequence, wherein the sequentially performing comprises:
processing priori information of a target semantic vector through the convolutional neutral network to obtain a weight parameter of the target semantic vector, wherein the target semantic vector is one of the plurality of semantic vectors; and
determining a text recognition result corresponding to the target semantic vector according to the weight parameter and the target semantic vector;
wherein the processing priori information comprises:
performing encoding processing on the target semantic vector through at least one first convolutional layer of the convolutional neutral network to obtain a first vector of the target semantic vector;
performing encoding processing on the priori information of the target semantic vector through at least one second convolutional layer of the convolutional neutral network to obtain a second vector corresponding to the priori information; and determining the weight parameter based on the first vector and the second vector;
wherein the performing encoding processing on the priori information comprises: responsive to the priori information comprising a text recognition result corresponding to a previous semantic vector of the target semantic vector, performing word embedding processing on the text recognition result corresponding to the previous semantic vector to obtain a feature vector corresponding to the priori information; and encoding the feature vector through the at least one second convolutional layer of the convolutional neutral network to obtain the second vector.

2. The method of claim 1, wherein the performing encoding processing on the priori information comprises:
encoding an initial vector corresponding to a start character in the priori information through the at least one second convolutional layer of the convolutional neutral network to obtain the second vector.

3. The method of claim 1, wherein the determining a text recognition result corresponding to the target semantic vector comprises:
obtaining an attention distribution vector corresponding to the target semantic vector based on the weight parameter and the target semantic vector; and
decoding the attention distribution vector through at least one de-convolutional layer of the convolutional neutral network to determine the text recognition result corresponding to the target semantic vector.

4. The method of claim 1, wherein the performing feature extraction processing comprises:
performing feature extraction on the image to be detected to obtain feature information; and
performing down-sampling processing on the feature information to obtain the plurality of semantic vectors.

5. An electronic device, comprising:
a processor; and
a memory, configured to store instructions that, when executed by the processor, cause the processor to perform the following operations comprising:
performing feature extraction processing on an image to be detected to obtain a plurality of semantic vectors, wherein each of the plurality of semantic vectors corresponds to a respective one of multiple characters of a text sequence in the image to be detected; and
sequentially performing recognition processing on the plurality of semantic vectors through a convolutional neutral network to obtain a recognition result of the text sequence, wherein the sequentially performing comprises:

processing priori information of a target semantic vector through the convolutional neutral network to obtain a weight parameter of the target semantic vector, wherein the target semantic vector is one of the plurality of semantic vectors; and determining a text recognition result corresponding to the target semantic vector according to the weight parameter and the target semantic vector;

wherein the processing priori information comprises: performing encoding processing on the target semantic vector through at least one first convolutional layer of the convolutional neutral network to obtain a first vector of the target semantic vector; performing encoding processing on the priori information of the target semantic vector through at least one second convolutional layer of the convolutional neutral network to obtain a second vector corresponding to the priori information; and determining the weight parameter based on the first vector and the second vector;

wherein the performing encoding processing on the priori information comprises: responsive to the priori information comprising a text recognition result corresponding to a previous semantic vector of the target semantic vector, performing word embedding processing on the text recognition result corresponding to the previous semantic vector to obtain a feature vector corresponding to the priori information; and encoding the feature vector through the at least one second convolutional layer of the convolutional neutral network to obtain the second vector.

6. The electronic device of claim 5, wherein the processor is configured to:

encode an initial vector corresponding to a start character in the priori information through the at least one second convolutional layer of the convolutional neutral network to obtain the second vector.

7. The electronic device of claim 5, wherein the processor is configured to:

obtain an attention distribution vector corresponding to the target semantic vector based on the weight parameter and the target semantic vector; and decode the attention distribution vector through at least one de-convolutional layer of the convolutional neutral network to determine the text recognition result corresponding to the target semantic vector.

8. The electronic device of claim 5, wherein the processor is configured to:

perform feature extraction on the image to be detected to obtain feature information; and perform down-sampling processing on the feature information to obtain the plurality of semantic vectors.

9. A non-transitory computer-readable storage medium, having stored thereon computer program instructions that, when executed by a processor of an electronic device, cause the processor to perform the following operations comprising:

performing feature extraction processing on an image to be detected to obtain a plurality of semantic vectors, wherein each of the plurality of semantic vectors corresponds to a respective one of multiple characters of a text sequence in the image to be detected; and sequentially performing recognition processing on the plurality of semantic vectors through a convolutional neutral network to obtain a recognition result of the text sequence, wherein the sequentially performing comprises:

processing priori information of a target semantic vector through the convolutional neutral network to obtain a weight parameter of the target semantic vector, wherein the target semantic vector is one of the plurality of semantic vectors; and determining a text recognition result corresponding to the target semantic vector according to the weight parameter and the target semantic vector;

wherein the processing priori information comprises: performing encoding processing on the target semantic vector through at least one first convolutional layer of the convolutional neutral network to obtain a first vector of the target semantic vector; performing encoding processing on the priori information of the target semantic vector through at least one second convolutional layer of the convolutional neutral network to obtain a second vector corresponding to the priori information; and determining the weight parameter based on the first vector and the second vector;

wherein the performing encoding processing on the priori information comprises: responsive to the priori information comprising a text recognition result corresponding to a previous semantic vector of the target semantic vector, performing word embedding processing on the text recognition result corresponding to the previous semantic vector to obtain a feature vector corresponding to the priori information; and encoding the feature vector through the at least one second convolutional layer of the convolutional neutral network to obtain the second vector.

* * * * *